United States Patent
Watts, Jr. et al.

(10) Patent No.: US 6,963,757 B1
(45) Date of Patent: *Nov. 8, 2005

(54) WIRELESS COMMUNICATION APPARATUS

(75) Inventors: La Vaughn F. Watts, Jr., Austin, TX (US); Erica Scholder, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,030

(22) Filed: Jan. 25, 2000

(51) Int. Cl.$^7$ .............................................. H04B 1/38
(52) U.S. Cl. ................ 455/557; 455/552.1; 455/556.1; 455/559
(58) Field of Search .................. 455/552.1, 556.1, 455/557, 558, 559

(56) References Cited

U.S. PATENT DOCUMENTS

| | | | |
|---|---|---|---|
| 4,978,317 A | 12/1990 | Pocrass | |
| 5,043,736 A | 8/1991 | Darnell et al. | |
| 5,244,409 A | 9/1993 | Guss, III et al. | |
| 5,300,938 A | 4/1994 | Maroun et al. | |
| 5,373,149 A | 12/1994 | Rasmussen | |
| 5,444,869 A * | 8/1995 | Stricklin et al. | 455/90.2 |
| 5,505,633 A * | 4/1996 | Broadbent | 439/329 |
| 5,557,288 A | 9/1996 | Kato et al. | |
| 5,613,873 A | 3/1997 | Bell, Jr. | |
| 5,619,395 A | 4/1997 | McBride | |
| 5,644,320 A | 7/1997 | Rossi | |
| 5,677,698 A | 10/1997 | Snowdon | |
| 5,739,791 A | 4/1998 | Barefield et al. | |
| 5,828,341 A | 10/1998 | Delamater | |
| 5,864,708 A | 1/1999 | Croft et al. | |
| 5,943,018 A | 8/1999 | Miller | |
| 6,295,197 B1 * | 9/2001 | Watts et al. | 361/683 |
| 6,597,924 B1 * | 7/2003 | Smith | 455/557 |

* cited by examiner

Primary Examiner—Temica Beamer
(74) Attorney, Agent, or Firm—Haynes and Boone, LLP

(57) ABSTRACT

A communication apparatus including a wireless communication device, a network interface device and a receptacle assembly body. A data transfer portion is attached to the receptacle assembly body. The data transfer portion is electrically connected to the network interface device. A wireless communication portion is attached to receptacle assembly body. The wireless communication portion is electrically connected to the wireless communication device. A single receptacle assembly can be used to separately interconnect a plurality of types of communication devices to an electronic device in a space efficient and cost effective manner.

21 Claims, 5 Drawing Sheets

WIRELESS COMMUNICATION APPARATUS

BACKGROUND

The disclosures herein relate generally to communication systems and more particularly to wireless communication apparatus in a computer. A variety of communication devices may be used in a computer. A conventional modem may be used to communicate data over a conventional telephone line. A network interface controller (NIC) card is used to provide data transmission over a computer network. Various types of radio frequency communication devices may be used in a computer for communication with a variety of types of networks such as a personal area network or a local area network.

Wireless communication is becoming a desired capability for portable and desktop computers. However, various aspects of a computer, particularly a portable computer, complicate the task of providing a wireless communication system in a computer. The addition of wireless communication capability in portable computers presents a variety of physical and functional design challenges. Some of these complications are also applicable to desktop computers.

The physical size of portable computers limits the space available for various components of a wireless communication interface. Expansion slots may be used for various communication devices. However, the number of available expansion card slots is limited. For example, in many portable computers, two PCMCIA expansion card slots are provided and one or both of the slots can be used to provide wireless communication capability. However, if PCMCIA cards are being used for providing two types of wireless communication capability (i.e. a wireless local area network PCMCIA card and a wireless personal area network PCMCIA card), both PCMCIA slots are occupied, precluding the use of other expansion card enabled functionality.

A wireless communication device for a computer typically includes a radio portion, a user interface portion, and an antenna portion. Depending on the particular configuration of the portable computer, the various portions of the wireless communication device may be mounted internally, externally or both internally and externally relative to the enclosure of the computer. Further, the various portions and components of the wireless communication device may be integral or discrete with respect to each other.

U.S. Pat. No. 5,828,341 discloses a portable computing device having a computer programmed to store and communicate information and a housing configured to house the computer. A communications device, provided in the housing, is controlled by the computer and configured to communicate information between the computing device and a remote computer. An antenna is carried by the housing and is configurable to electrically couple with the communications device for communicating radio frequency information with the remote computer. A signal coupling device is carried by the housing and is configured to removably mate in signal transmitting relationship with an external antenna via a complementary mating signal coupling device. A switch provided with the device is constructed and arranged to selectively connect the communications device with a dedicated antenna and an external antenna.

U.S. Pat. No. 5,606,594 discloses a telephone accessory and method of telecommunicating for a personal digital accessory ("PDA"). The PDA includes a chassis of particular dimensions and input/output ("I/O") circuitry on a front surface of the chassis. The chassis contains processing circuitry coupled to the I/O circuitry. The telephone accessory includes a body portion having a concave surface adapted to receive the chassis. A first body extension and a second body extension are coupled to opposite ends of the body portion. Communications circuitry capable of being coupled to the processing circuitry in the chassis when the chassis is received into the concave surface on the body portion is provided. The communications circuitry includes a communications transceiver capable of coupling the processing circuitry to remote processing circuitry via a communications link.

U.S. Pat. No. 5,373,149 discloses a PCMCIA wireless credit card modem fabricated for using two credit card sized sections interconnected by a hinge. The first section contains modem circuitry and the second section contains an antenna and radio circuitry. The two sections form a 90 degree angle in the open position. The section with the modem circuitry fits into a type I or II PCMCIA slot in a portable computer. The section with the antenna remains on an outside portion of the computer. The folding electronic card assembly can interface to several different PCMCIA card slots.

A key challenge in providing wireless communication capability in a computer, particularly in a portable computer, is the physical mounting or interconnecting of the various components of the communication device. Portable computers produced by the same manufacturer, as well as by different manufacturers, are not identical. In addition, it is preferred for computers to be designed for permitting wireless capability to be enabled subsequent to the manufacture of the computer, such as by the user following purchase of the computer. Consequently, conventional techniques for providing wireless communication capability require numerous configurations of wireless communication devices, or at least components thereof, to accommodate the various types of portable computers and situations under which wireless communication capability is provided.

Another key challenge in providing wireless communication capability in a computer, particularly in a portable computer, is enabling a modular and dynamic design solution such that wireless communication devices of various configurations (i.e. designed according to different radio specifications) can be cost-effectively and conveniently implemented in a manufacturing setting as well as by the user subsequent to the manufacture of the computer.

A number of different industry standards for radio specifications exist. These radio specifications include, for example, the specification of Bluetooth Special Interest Group, referred to by the tradname Bluetooth, or the specification of the Institute of Electrical and Electronics Engineers Incorporated, referred to as 802.11. In addition to the industry standards for radio specifications, a number of design criteria mandated by various regulatory agencies, such as the Federal Aviation Administration, also exist. Conventional techniques for providing wireless communication capability are limited in the number of different industry standards that are compatible. Furthermore, these conventional techniques do not provide a suitable solution for complying with certain regulatory agency and industry standard mandated design criteria.

Therefore, what is needed is a wireless communication system that provides a generally universal packaging solution across a wide range of physical computer designs and that permits interconnect compatibility with a plurality of different input signals.

SUMMARY

One embodiment, accordingly, provides a multi-function receptacle assembly that supports wireless communication functionality in an electronic device. To this end, a receptacle assembly includes a body, a data transfer portion attached to the body, and a wireless communication portion attached to body.

A principal advantage of this embodiment is that a single receptacle assembly can be used to separately interconnect with a plurality of types of communication devices to an electronic device in a space efficient and cost effective manner.

BRIEF DESCRIPTION OF THE DRAWING FIGURES

DETAILED DESCRIPTION

Figure 1:
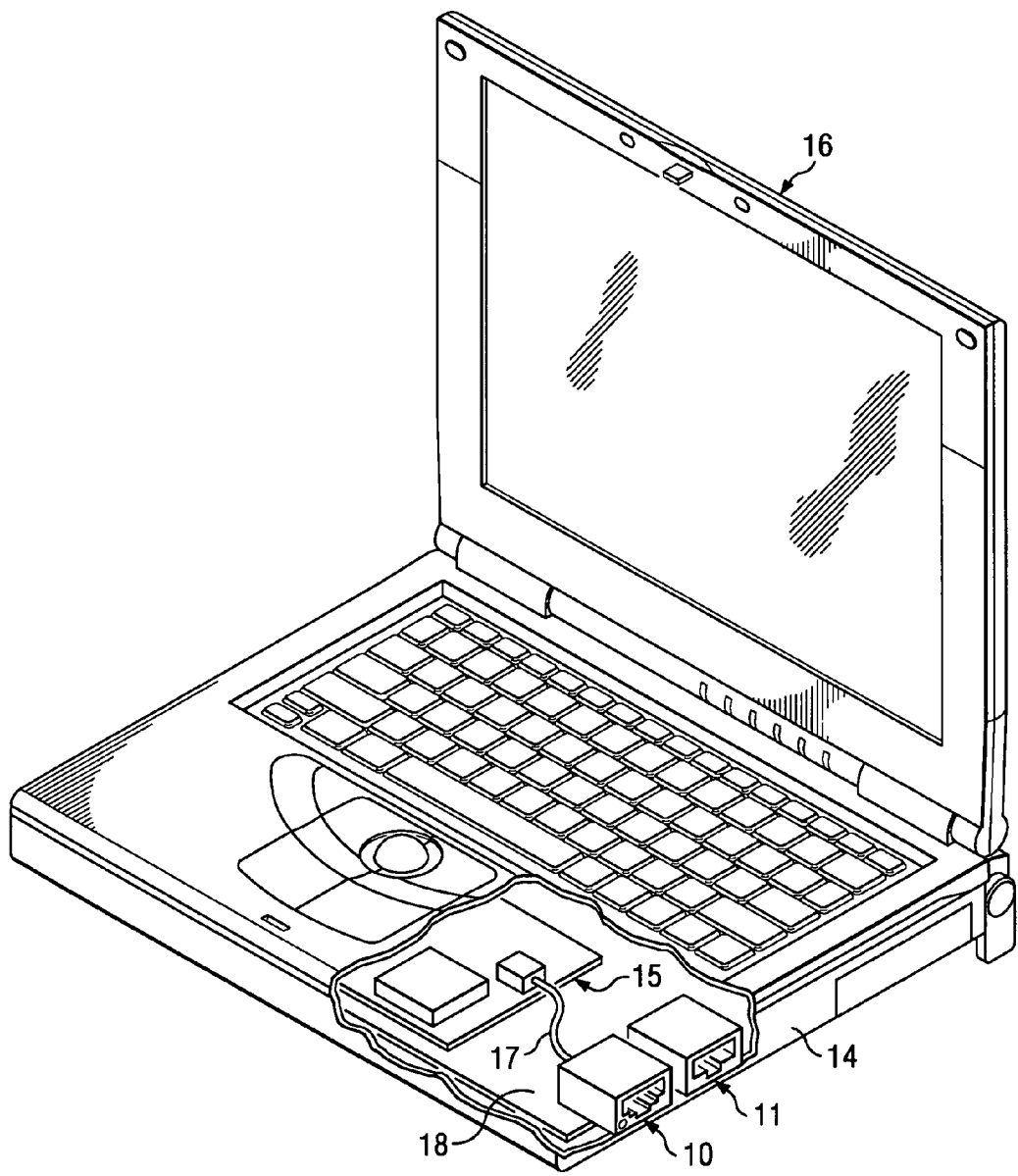
FIG. 1 is a perspective view illustrating an embodiment of a portable computer.
Figure 2:
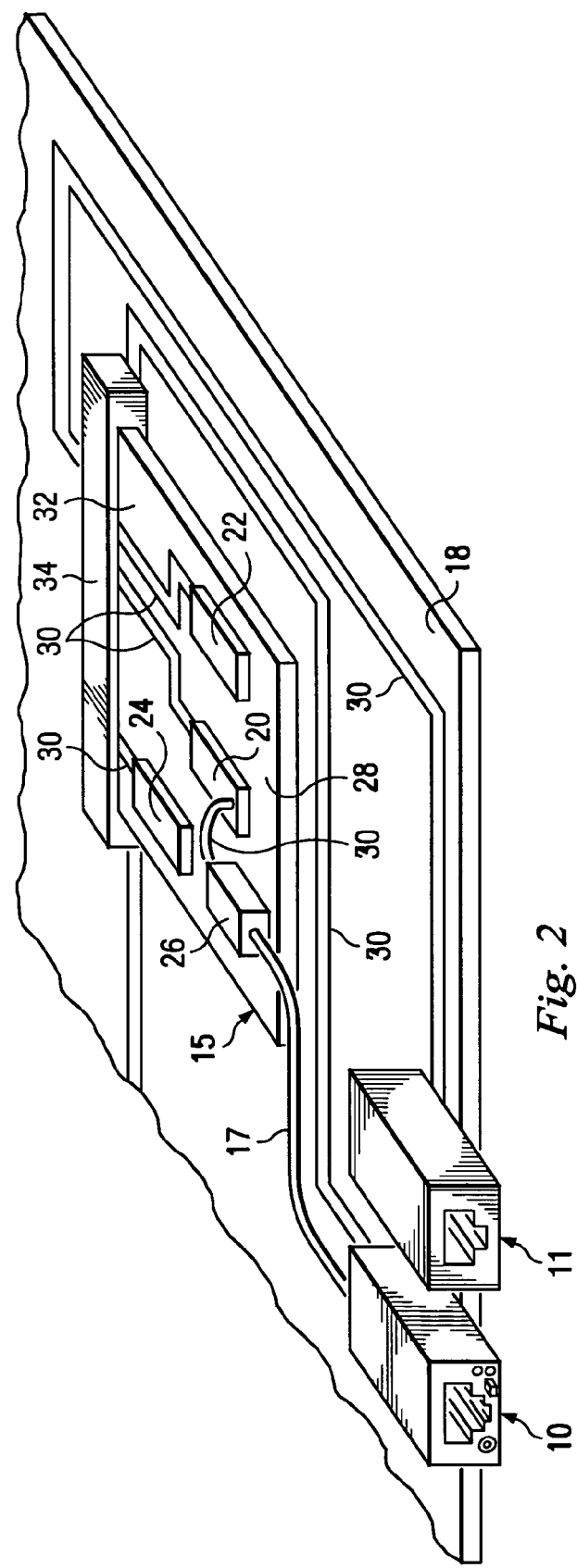
FIG. 2 is a perspective view illustrating an embodiment of a communication apparatus.

Referring to FIGS. 1 and 2, a first receptacle assembly 10, second receptacle assembly 11, and communication module 15 are mounted in an enclosure 14, FIG. 1, of a portable computer 16. A controlled impedance interface 17 such as a coaxial cable is electrically connected between the first receptacle assembly 10 and the communication module 15. The communication module 15, the first receptacle assembly 10 and the second receptacle assembly 11 are mounted on a printed circuit substrate 18 such as a motherboard of the portable computer 16.

The portable computer 16 illustrated in FIG. 1 is an example of an electronic device in which receptacle assemblies such as the first and second receptacle assemblies 10, 11 may be mounted. Other types of electronic devices in which receptacle assemblies such as the first and second receptacle assemblies 10, 11 may be mounted include other types of computers, (i.e. desktop computers), personal digital assistants, and the like.

An electronic device such as the portable computer 16 may include a plurality of receptacle assemblies such as the first and second receptacle assemblies 10, 11 illustrated above. Typically, if two or more receptacle assemblies are provided, the first receptacle assembly 10 is of a different type than the second receptacle assembly 11. For example, it is common in computers to have one receptacle assembly configured for receiving an RJ11 type jack and another receptacle assembly configured for receiving an RJ45 type jack. The RJ11 type jack is typically used for connecting a telephone line to the computer and the RJ45 type jack is typically used for connecting the computer to a local area network data line. Conventional jack assemblies having receptacles for receiving an RJ11-type jack or an RJ45 type jack are commercially available from manufacturers such as Foxconn Incorporated and Amp Incorporated.

Referring now to FIG. 2, the communication module 15 includes a wireless communication device 20 such as a radio frequency (RF) communication module, a network interface device 22 such as a network interface controller (NIC) card, a modem device 24 and a connector 26 mounted on a printed circuit substrate 28. A lead 30 is electrically connected between the connector 26 and the wireless communication device 20. The printed circuit substrates 18, 28 are preferably printed circuit boards including a plurality of conductive traces 30 for routing signals and power to the various components mounted thereon. Each one of the traces 30 may represent more than one trace extending between two system components. In some cases, for clarity, only one of the traces 30 is shown to extend between two or more system components. The printed circuit substrate 28 includes an edge connector portion 32 for being connected to a connector 34, such as a PCI bus connector, of the printed circuit substrate 18.

An example of a wireless communication device 20 includes a RF wireless communication module offered by Aironet Incorporated under the model no. PC4800A (part no. 100-005048-001). An example of a network interface device 22 is an NIC card offered by 3Com Incorporated under the part no. 3C905C-TX-M. An example of a modem device 24 includes a soft modem semiconductor device (a soft modem) offered by PCTel under the part number PCT2303W.

Figure 3:
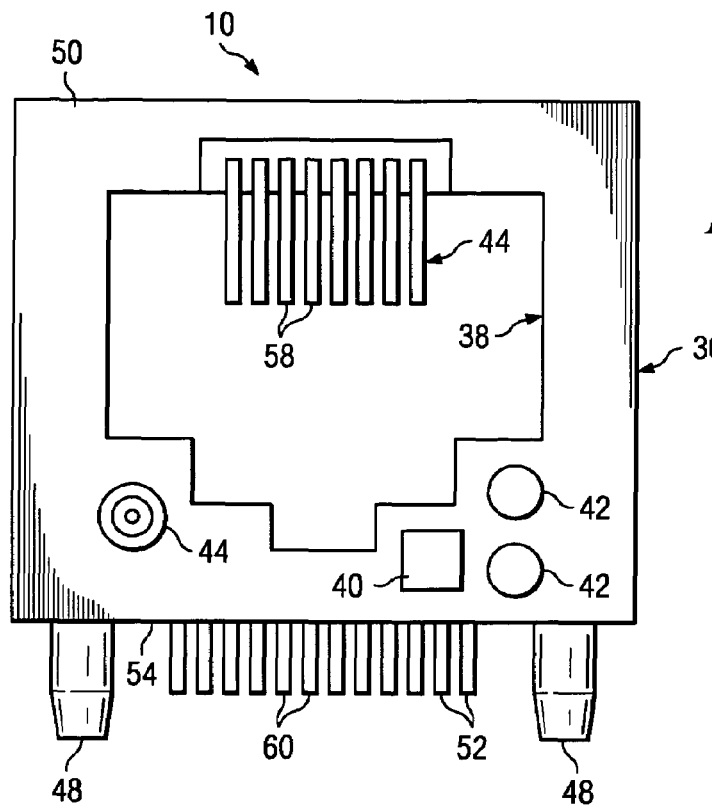
FIG. 3 is a front view illustrating an embodiment of a receptacle assembly.
Figure 4:
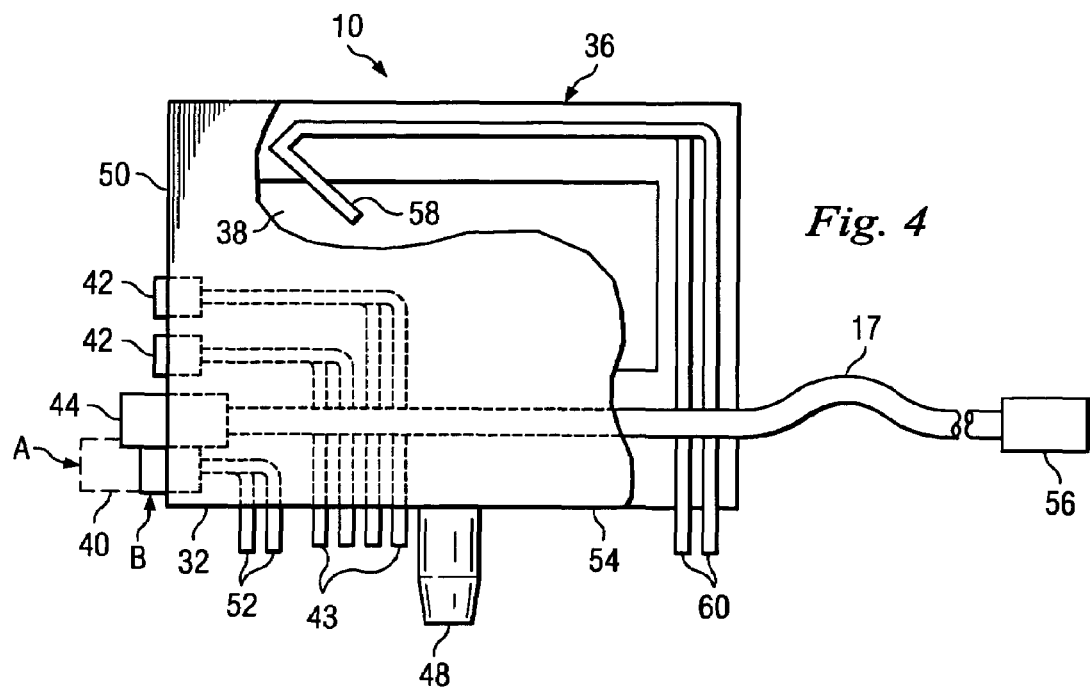
FIG. 4 is a side view of the receptacle assembly illustrated in FIG. 3.

An embodiment of the receptacle assembly 10 is illustrated in FIGS. 3 and 4. The receptacle assembly 10 includes a body 36 having a receptacle 38, a switch 40, a plurality of illumination devices 42 and a connector 44 for attaching an antenna thereto. A plurality of mounting pins 48 are attached to the body 36 for physically attaching the receptacle assembly 10 to the housing 14 or to one of the printed circuit substrates 18, 28. The receptacle 38 extends through a front face 50 of the body 36. By integrating the switch 40, illumination devices 42 and connector 44 into the body 36, the physical volume of the receptacle assembly 10 can be used to add additional functionality to an electronic device, such as the portable computer 16, without requiring any significant additional space.

A jack (not shown) may be inserted through the front face 50 into the receptacle 38. The switch 40, illumination devices 42 and connector 44 are mounted to extend through the front face 50 of the body 36. It is contemplated that the switch 40, illumination devices 42 and connector 44 may be mounted in different orientations. However, it is desirable for the switch 40 to be readily accessible and for the illumination devices 42 to be readily viewable during operation of the computer 16.

The body 36 is preferably fabricated using a known process such as injection molding and is preferably made of a commercially available material such as a suitable type of plastic. The receptacle 38 is preferably integrally molded as a feature of the body 36. In other embodiments, the receptacle 38 may be separately formed from the body 36 and attached to the body 36 using known techniques. The switch 40, illumination devices 42 and the antenna connector 44 may be insert molded into the body 36 or mounted on the body 36 subsequent to the fabrication of the body 38.

The switch 40 includes a plurality of interconnect members 52 that extend through a mounting face 54 of the body 36. The interconnect members 52 permit the switch 40 to be electrically connected to the printed circuit substrate 18, FIG. 2. It is contemplated that the interconnect members 52 may extend through a face of the body 36 different from the mounting face 54.

The interconnect members 52 are configured for being electrically connected to a substrate such as the printed circuit substrate 18, illustrated in FIG. 2, thereby permitting electrical connection with the communication module 15. By moving the switch 40 between a first position A and a second position B, the operation of the wireless communication device 20 may be altered. For example, the wireless communication device 20 may be operable when the switch is in the first position A and rendered inoperable when the switch 40 is moved from the first position A to the second position B. This may be readily accomplished by connecting the switch 40 in a manner whereby power to the wireless communication device 20 is controlled by the position of the switch 40.

The connector 44, preferably a coaxial-type antenna connector, serves as a wireless communication portion of the receptacle assembly 10. The controlled impedance interface 17 is attached at a first end to the connector 44. The controlled impedance interface 17 is attached at a second end to a jack 56. The jack 56 is configured to be attached to a connector such as the connector 26, FIG. 2.

The illumination devices 42, FIGS. 3 and 4, are light emitting diodes including interconnect members 43 that extend from a face of the body 36, such as the mounting face 54. The interconnect members 43 are configured for being electrically connected to a substrate such as the printed circuit substrate 18, illustrated in FIG. 2, thereby permitting electrical connection with other system components, such as the communication module 15, mounted on the printed circuit substrate 18.

The illumination devices 42 are electrically connected to the communication module 15 for visually indicating when the communication module 15 is sending and receiving information. Other known apparatus may be used in conjunction with the receptacle assembly 10, disclosed herein, for visually indicating when the communication module 15 is sending and receiving information. U.S. Pat. No. 5,613,873 discloses a technique for using light conducting members, such as light pipes, that are mounted in a receptacle assembly for conducting light from light emitting diodes that are mounted directly on a substrate.

A plurality of contacts 58, FIGS. 3 and 4, are mounted on the body 36. The contacts 58 extend into the receptacle 38 for being engaged by mating contacts of a jack (not shown) inserted into the receptacle 38. The receptacle 38 serves as a data communication portion of the receptacle assembly 10. An interconnect member 60 is electrically connected to each one of the contacts 58. Each interconnect member 60 extends from a face of the body 36, such as the mounting face 54. The interconnect members 60 are configured for being electrically connected to a substrate such as the printed circuit substrate 18, illustrated in FIG. 2, thereby permitting electrical connection with other system components mounted on the printed circuit substrate 18, such as the communication module 15.

Figure 5:
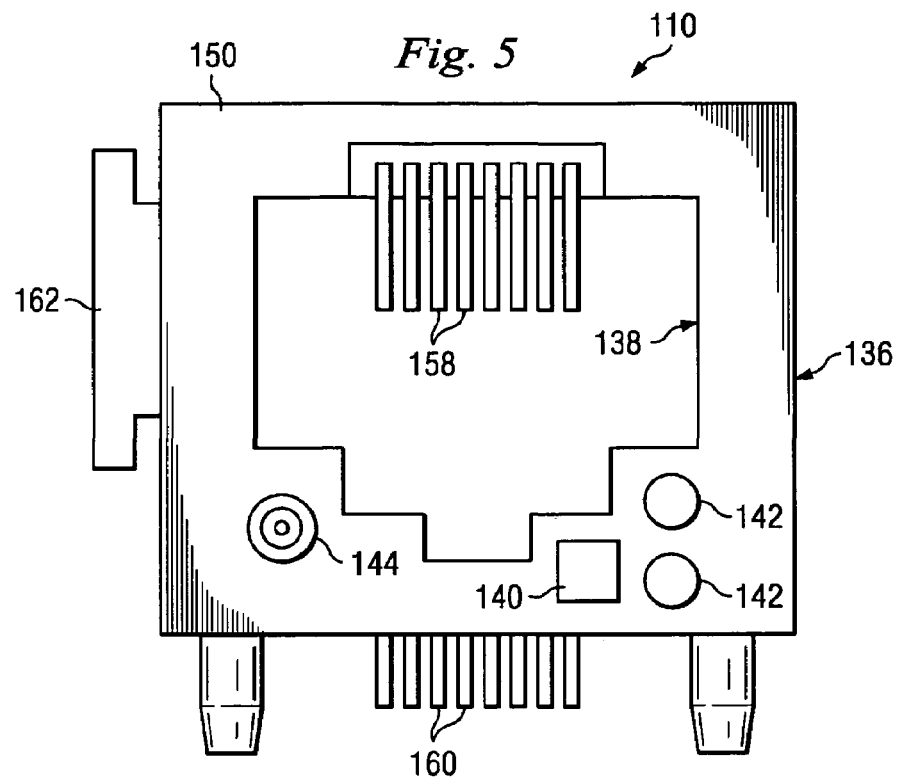
FIG. 5 is front view of another embodiment of a receptacle assembly.
Figure 6:
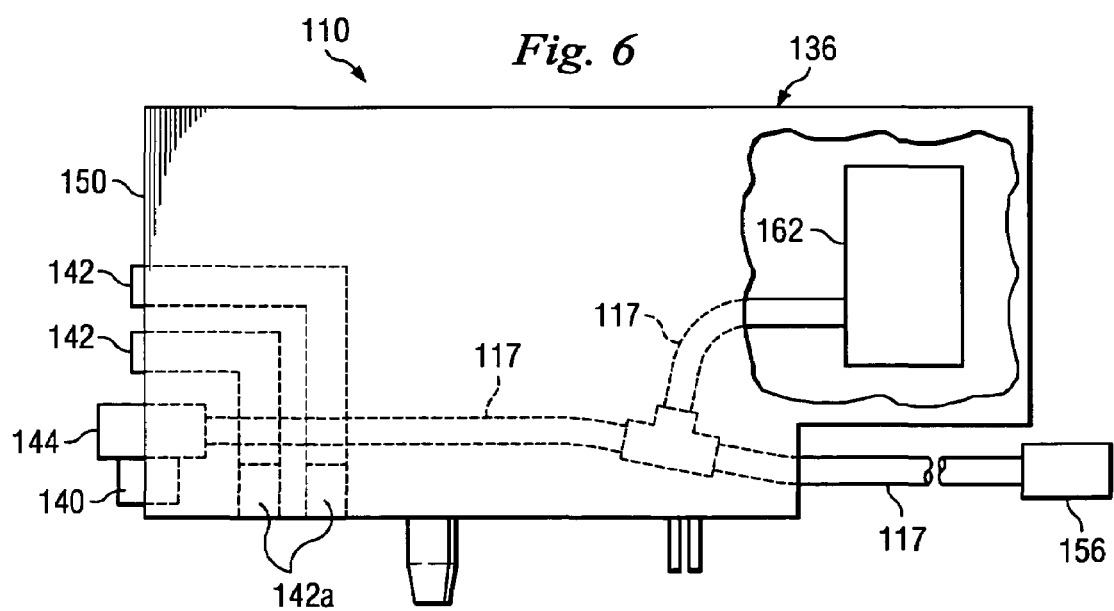
FIG. 6 is a side view of the receptacle assembly illustrated in FIG. 5.

Another embodiment of a receptacle assembly 110 is illustrated in FIGS. 5 and 6. The receptacle assembly 110 includes a body 136 having a receptacle 138, a switch 140, a plurality of illumination devices 142, and a connector 144 attached to the body 136. The receptacle 138 extends through a front face 150 of the body 136. An antenna 162 is mounted on the body 136. A controlled impedance interface 117 has a jack 156 at a first end. At a second end, the controlled impedance interface 117 is connected to the connector 144 and to the antenna 162. The illumination devices 142 are light conducting members including a cavity 142a for receiving a powered illumination device such as a light emitting diode mounted on the substrate 18, FIG. 2.

Figure 7:
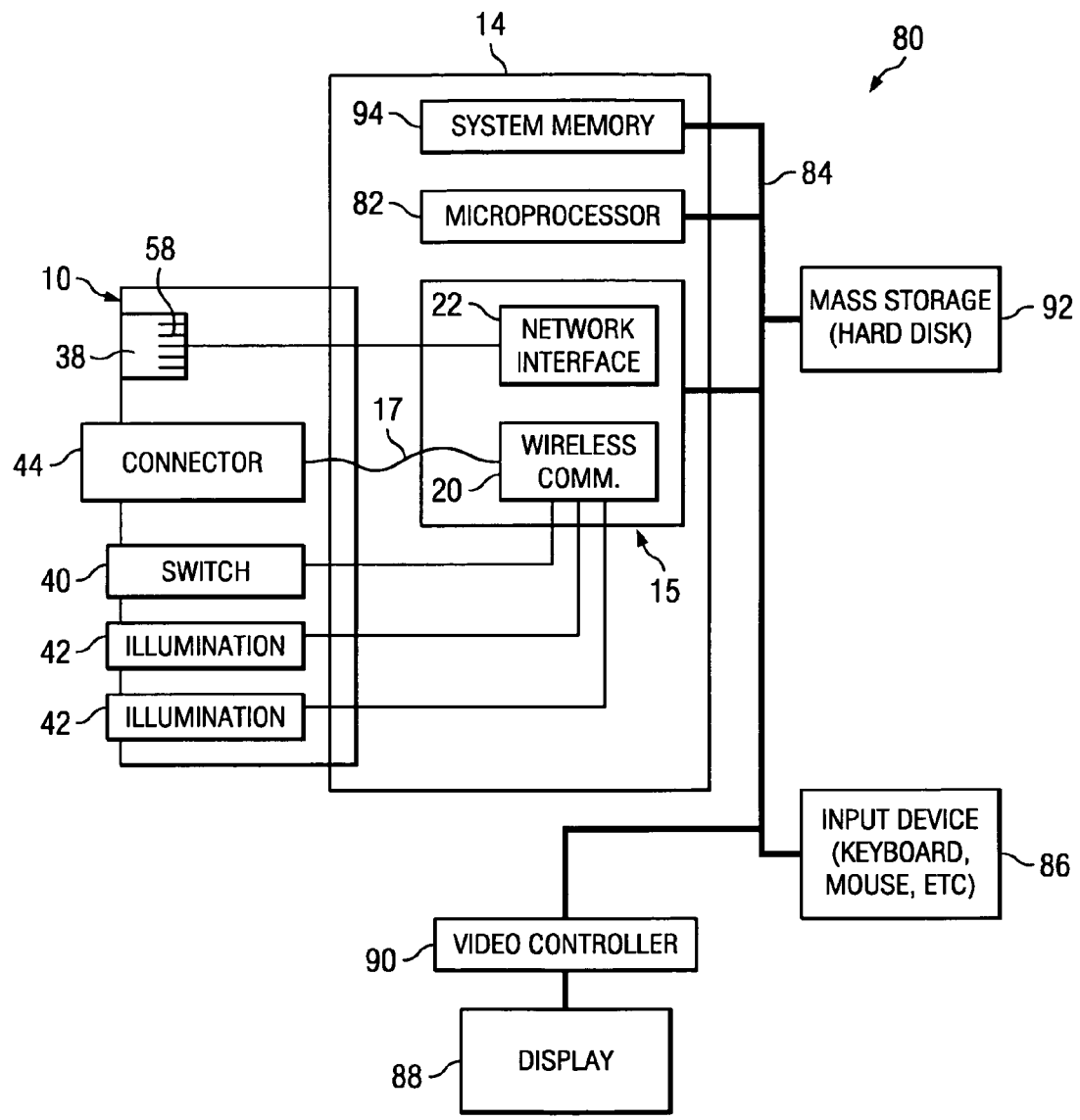
FIG. 7 is a block diagram view illustrating and embodiment of a computer system.

An embodiment of a computer system 80 is illustrated in FIG. 7. The computer system 80 includes at least one microprocessor 82. The microprocessor 82 is connected to a signal bus 84. The signal bus 84 serves as a connection between the microprocessor 82 and other components of the computer system 80. One or more input devices 86 may be coupled to the microprocessor 82 to provide input to the microprocessor 82. Examples of input devices include keyboards, touchscreens, and pointing devices such as a mouse, a trackball and a trackpad. The computer system 80 may also include a display 88 which is coupled to the microprocessor 82 typically by a video controller 90. Programs and data are stored on a mass storage device 92 which is coupled to the microprocessor 82. Mass storage devices include components such as hard disks, optical disks, magneto-optical drives, floppy drives, and the like. A system memory 94 provides the microprocessor 82 with fast storage to facilitate execution of computer programs by the microprocessor 82. It should be understood that other busses and intermediate circuits can be employed between the components described above and microprocessor 82 to facilitate interconnection between the components and the microprocessor 82.

Still referring to FIG. 7, the communication module 15, the microprocessor 82 and the system memory 94 are mounted in the enclosure 14. The body 36 of the receptacle assembly 10 is at least partially mounted in the enclosure 14. The communication module 15 is electrically connected to the bus 84 for communicating with other components of the computer system, such as the microprocessor 82. The contacts 58 of the receptacle 38 are electrically connected to the network interface device 22 of the communication module 15. The switch 40, connector 44, and illumination devices are electrically connected to the wireless communication device 20 of the communication module 15.

As a result, one embodiment provides a receptacle assembly including a body, a data transfer portion attached to the body, and a wireless communication portion attached to body.

Another embodiment provides a communication apparatus including a wireless communication device, a network interface device and a receptacle assembly body. A data transfer portion is attached to the receptacle assembly body. The data transfer portion is electrically connected to the network interface device. A wireless communication portion is attached to the receptacle assembly body. The wireless communication portion is electrically connected to the wireless communication device.

A further embodiment provides a computer including an enclosure and a microprocessor mounted in the enclosure. A system memory is coupled to provide storage to facilitate execution of computer programs by the microprocessor. An input is coupled to provide input to the microprocessor. A display is coupled to the processor by a video controller. A mass storage is coupled to the microprocessor. A wireless communication device is electrically connected to the microprocessor. A network interface device is electrically connected to the microprocessor. A receptacle assembly body is provided. A data transfer portion is attached to the receptacle assembly body. The data transfer portion is electrically connected to the network interface device. A wireless communication portion is attached to receptacle assembly body. The wireless communication portion is electrically connected to the wireless communication device.

As it can be seen, the receptacle assembly disclosed herein provides several advantages. A single receptacle in a receptacle assembly can be used to separately interconnect with a plurality of types of communication devices. Additional functionality can be added to the receptacle assembly without requiring any substantial increase in the size of the receptacle assembly. The space required for mounting a conventional receptacle assembly is suitable for the mounting of the receptacle assembly disclosed herein. A simple solution is provided for enabling the operation of one or more of the communication devices connected to the receptacle assembly to be manually enabled and/or disabled. An antenna connector, illumination devices and switch can be effectively provided in an existing physical volume required by a conventional receptacle assembly. A single receptacle assembly configuration can be used in a number of different models of electronic devices as well as in electronic devices made by different manufacturers. The receptacle assembly can be cost-effectively manufactured and installed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A receptacle assembly, comprising:
   a body used for connecting a computer to a local area network;
   a receptacle, a switch and an illumination device integrated into the body; and
   a wireless communication portion attached to body, the wireless communication portion including an antenna connector attached to the body, the switch and the illumination device extending from a face of the body in a viewable position when in use.

2. The receptacle assembly of claim 1 wherein the wireless communication portion includes a substantially integral antenna.

3. The receptacle assembly of claim 1 wherein the wireless communication portion includes a controlled impedance interface.

4. The receptacle assembly of claim 3 wherein the controlled impedance interface is a coaxial-type cable.

5. The receptacle assembly of claim 1 wherein the receptacle includes an RJ45-type receptacle having a plurality of contacts.

6. The receptacle assembly of claim 1 wherein the switch is a manually operable switch.

7. The receptacle assembly of claim 6 wherein the switch is manually movable between a first position and a second position.

8. The receptacle assembly of claim 1 further comprising:
   a plurality of illumination devices attached to the body.

9. The receptacle assembly of claim 8 wherein each one of the illumination devices includes a light emitting diode.

10. The receptacle assembly of claim 8 wherein each one of the illumination devices includes a light conducting member having a cavity therein for receiving a powered illumination device.

11. A communication apparatus, comprising:
    a wireless communication device;
    a connector coupled to the wireless communications device;
    a receptacle assembly body coupled to the connector;
    a receptacle, a switch and an illumination device integrated into the body; and
    a wireless communication portion attached to receptacle assembly body, the wireless communication portion being electrically connected to the wireless communication device, the switch and the illumination device extending from a face of the body in a viewable position when in use.

12. The apparatus of claim 11 wherein the wireless communication device includes a radio and wherein the wireless communication portion includes an antenna attached to the radio.

13. The apparatus of claim 11 wherein the switch is a manually operable switch.

14. The apparatus of claim 13 wherein the switch is movable between a first position and a second position, the wireless communication device being made inoperable when the switch is moved from the first position toward the second position.

15. The apparatus of claim 11 further comprising:
    a plurality of illumination devices attached to the body.

16. The apparatus of claim 15 wherein each one of the illumination devices includes a light emitting diode electrically connected to the wireless communication device.

17. The apparatus of claim 15 wherein each one of the illumination devices includes a light conducting member including a cavity therein for receiving a powered illumination device.

18. The apparatus of claim 17 wherein each one of the powered illumination devices includes a light emitting diode electrically connected to the wireless communication device.

19. The apparatus of claim 11 wherein the wireless communication portion includes a connector electrically connected to the wireless communication device.

20. The apparatus of claim 11 further comprising:
    a controlled impedance interface connected between the wireless communication device and the wireless communication portion.

21. A computer system, comprising:
    an enclosure;
    a microprocessor mounted in the enclosure;
    a storage coupled to the microprocessor;
    a wireless communication device electrically connected to the microprocessor;
    a connector coupled to the wireless communication device;
    a receptacle assembly body coupled to the connector and integrating a receptacle, a switch and an illumination device;
    a data transfer portion attached to the receptacle assembly body, the data transfer portion being electrically connected to the network interface device; and
    a wireless communication portion attached to receptacle assembly body, the wireless communication portion being electrically connected to the wireless communication device, the switch and the illumination device extending from a face of the receptacle in a viewable position when in use.

* * * * *